United States Patent [19]

Ishimaru

[11] 4,135,409

[45] Jan. 23, 1979

[54] DEVICE FOR CONVERTING ROCKING MOTION INTO RECIPROCATING ROTARY MOTION

[76] Inventor: Rakuichi Ishimaru, 2-9-12, Uyina-Higashi, Hiroshima-shi, Hiroshima-ken, Japan

[21] Appl. No.: 775,851

[22] Filed: Mar. 9, 1977

[51] Int. Cl.² ............................................. F16H 21/40
[52] U.S. Cl. .................................. 74/76; 74/571 M; 74/128; 280/252; 280/253; 74/30; 74/70
[58] Field of Search ................ 74/76, 30, 571 M, 128, 74/571 L; 280/236, 252, 253

[56] References Cited
U.S. PATENT DOCUMENTS 2,270,513   2/1942   Griffiths ..................................... 74/76

*Primary Examiner*—Samuel Scott
*Assistant Examiner*—Gerald A. Anderson
*Attorney, Agent, or Firm*—Carroll F. Palmer

[57] ABSTRACT

A stepless speed change gear for bicycles and the like. A device is disclosed wherein a rotary input is converted to reciprocating motion by a rack and pinion, the rack is mounted at the end of a lever which is oscillated; an arm is mounted on the lever, connecting it to a rod which is driven in alternating rotary directions; the rod is connected to the output shaft by two ratchets driven in alternate directions by said rod, said ratches are geared to said output shaft in such a way that the output is a continuous rotary motion. The speed change mechanism being that said arm is slidably mounted on said lever and rod so that the nearer the arm is drawn to the end of the lever on which said rack is mounted the greater is the oscillating motion imparted and the greater is the subsequent angle through which the rod is rotated.

3 Claims, 11 Drawing Figures

DEVICE FOR CONVERTING ROCKING MOTION INTO RECIPROCATING ROTARY MOTION

BACKGROUND OF THE INVENTION

The present invention relates to a stepless speed change gear.

Until now, many devices of various constructions have been developed to convert rotary motion into linear reciprocating motion. The typical one is a crank chain. The crank chain has such a contruction that a crank is mounted on a rotating shaft, and a crank rod is connected to a reciprocating motion part, for example, a piston.

However, in the case of a crank chain, the relation between crank angle and the amount of the displacement of a piston is represented by sine curve, as shown by the broken line in FIG. 1a, while speed change ratio of the piston with regard to time is represented by a cosine curve, as shown by the broken line in FIG. 1b. Therefore the piston does not show uniform motion during its linear motion in one direction.

On the other hand, many devices of various constructions have also been conceived in which a rocking rod whose one end is pivotally supported is put in rocking motion around its fulcrum as a center, and such rocking motion is transmitted to a rotating shaft to reciprocate it. However, in the case of the above-mentioned devices, when the rocking angle of the rocking rod is constant, the rotating angle of reciprocating rotary motion of the rotating shaft is usually apt to be uniform. For this reason, a very complicated construction is required to adjust the above-mentioned rotating angle. Meantime, various constructions have been devised as means to convert reciprocating rotary motion into unidirectional rotary motion. A well known example is one way clutch using a ratchet mechanism. However, most of the conventional one way clutches transmit the power of the reciprocating rotary shaft to an output shaft only during rotating motion without using the power of the above shaft during its returning rotating motion. Therefore, the conventional devices of this kind have very low power transmission efficiency.

SUMMARY OF THE INVENTION

The present invention aims at eliminating these disadvantages of the conventional devices for converting rocking motion into reciprocating rotary motion. An object of the present invention is to provide a device to convert rotary motion into linear reciprocating motion in which a linear reciprocating part makes uniform motion during unidirectional linear motion, as shown by the solid line in FIG. 1b.

Another object of the present invention is to provide a device to convert rocking motion into reciprocating rotary motion in which when the rocking angle of a rocking rod is constant, the rotating angle of reciprocating rotary motion of the rotating shaft can be easily varied and controlled by a simple construction.

Further another object of the present invention is to provide a device of simple construction to convert reciprocating rotary motion into unidirectional rotary motion in which the power of a rotating shaft can be transmitted to an output shaft during both going and returning reciprocating rotary motion.

BRIEF DESCRIPTION OF THE DRAWINGS

FIGS. 2 through 9 show a preferred embodiment of the device according to the present invention as applied to a stepless speed change gear for a bicycle, in which:

FIG. 2 is a schematic side view of the driving system of a bicyle;

FIG. 3 is a section of the speed change gear of the bicycle;

FIG. 4 is a section of the speed change gear shown in FIG. 3 taken on the line IV—IV of FIG. 3;

FIG. 5 is a schematic view showing the relationship between the input shaft and the interlocking shaft;

FIGS. 6a and 6b show the relationship between the interlocking shaft and the floating frame, with FIG. 6a showing the section thereof and FIG. 6b showing the plane view thereof;

FIG. 7 is a side view showing the interlocking relationship of the rocking rod;

FIG. 8 is a schematic view showing the relationship between the ratchet pawl and the ratchet wheel; and FIG. 9 is a schematic view showing the relationship between the output shaft and the intermediate gear; and FIGS. 10 and 11 are schematic diagrams showing another preferred embodiment of the device according to the present invention, with FIG. 10 showing the section of an automatic pulling device and FIG. 11 showing the relationship between the interlocking shaft and the floating frame corresponding to FIG. 6a.

DETAILED DESCRIPTION OF THE EMBODIMENTS

Hereinafter, the present invention will be described in detail with reference to the accompanying drawings showing a preferred embodiment of the present invention as applied to a stepless speed change gear for a bicycle.

Figure 2:
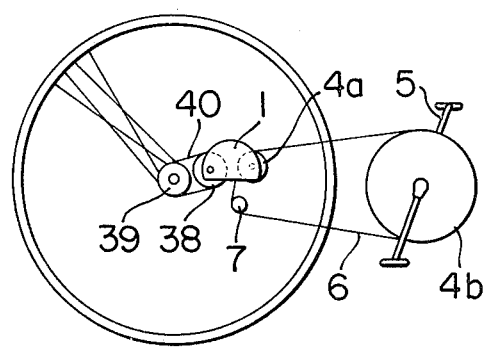
Figure 3:
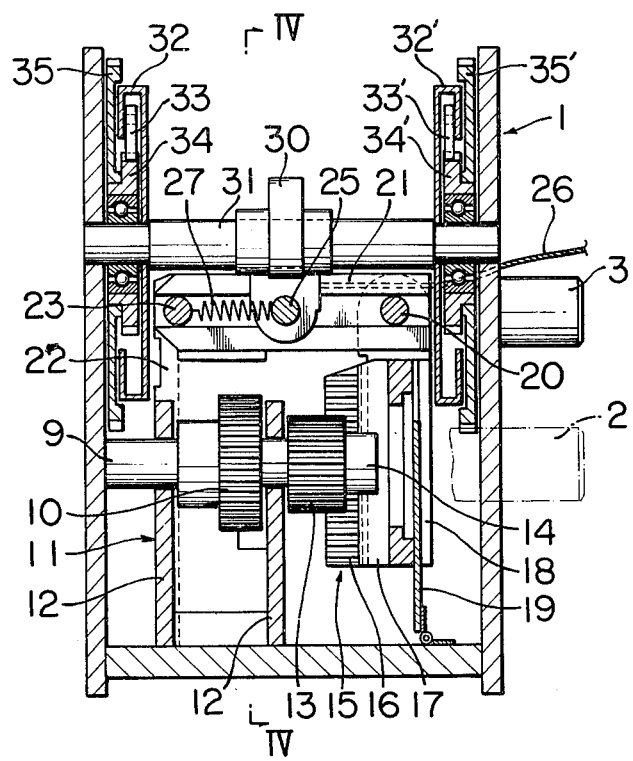
Figure 5:
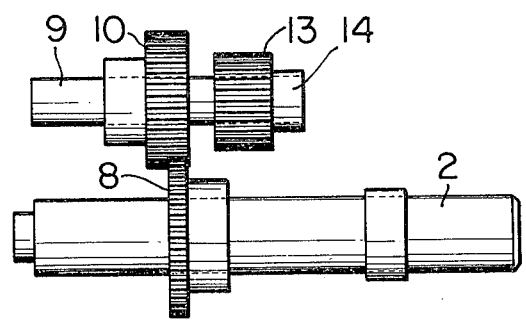
Figure 6:
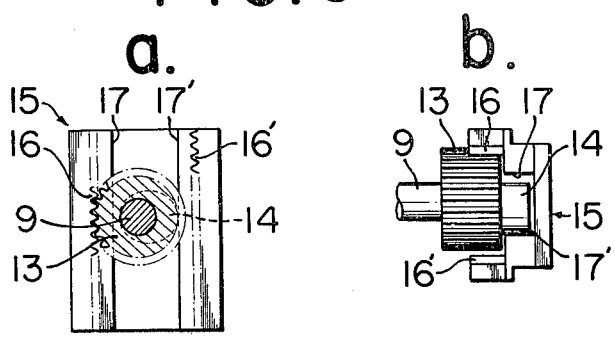
Figure 7:
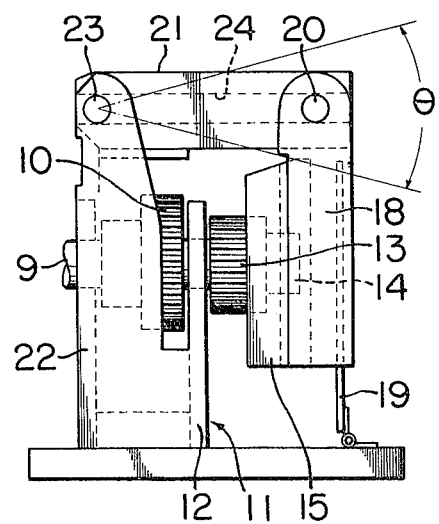
Figure 8:
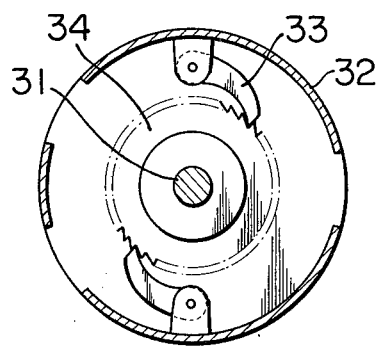
Figure 9:
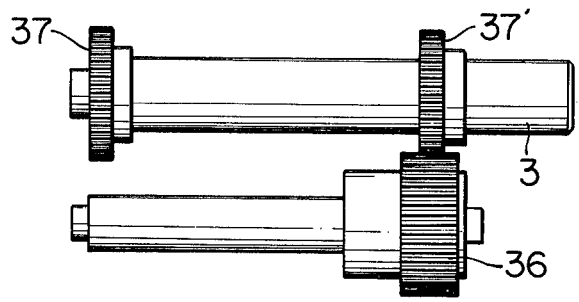

In the drawings, 1 is the frame on which the input shaft 2 and the output shaft 3 are approximately horizontally mounted in parallel relation to each other. One end of said input shaft 2 projects out from the frame 1, and the projected end possesses the driven sprocket 4a shown in FIG. 2. The driven sprocket 4a is interlocked with the driving sprocket 4b which is turned by the pedal 5 of a bicycle by means of the chain 6. Accordingly, the input shaft 2 is made to rotate by the pedal 5. Meantime, 7 is the tension sprocket. As shown in FIG. 5, the driving toothed wheel 8 is installed at approximately middle portion of the input shaft 2. The driving toothed wheel 8 meshes with the driven toothed wheel 10 mounted on the interlocking shaft 9 so as to transmit the rotating motion of the input shaft 2 to the interlocking shaft 9. The interlocking shaft 9 corresponding to the rotating shaft of the present invention is pivotably and rotatably supported between the opposite vertical walls 12 and 12 on the supporting frame 11 installed in the frame 1. On the tip of the interlocking shaft 9, the pinion 13 and the fan-shaped cam 14 are mounted in a body. Around the pinion 13 and the cam 14, the floating frame 15 is disposed. The floating frame 15 is provided with racks 16 and 16' which are located on both sides of the pinion 13 and face each other spaced apart by an interval. In addition, the floating frame 15 possesses the opposite cam supports 17 and 17' on both sides of the cam 14. When the cam 14 rotates by the rotation of the interlocking shaft 9, as shown in FIGS. 6a and 6b, the cam 14 presses and displaces one cam support 17'. As a result, the floating frame 15 moves horizontally, whereby the pinion 13 meshes with the rack 16 on the side opposite to the cam support 17' and the floating frame moves upward or downward. When the cam 14 is rotated and presses the other cam support 17, the floating frame 15 moves horizontally in an opposite direction. As a result, the pinion 13 meshes with the other rack 16' to move the floating frame in the opposite direction, namely downward or upward. Therefore, the floating frame 15 traces a rectangular track according to the rotation of the interlocking shaft 9.

The floating frame 15 is secured on the elevating frame 18 which corresponds to the linear reciprocating part of the present invention. Though the detailed movement of the floating frame is not shown in the drawings, when it moves up and down, the elevating frame 18 also makes an up-and-down motion in a body. When the floating frame 15 moves horizontally, the elevating frame does not move horizontally at all. This premits such horizontal motion of the floating frame 15. The up-and-down motion of the elevating frame 18 is guided by means of the guide plate 19 vertically installed on the bottom of the frame 1.

By virtue of this construction, the rotating motion of the input shaft 2 is converted into the linear reciprocating motion of the elevating frame 18.

Figure 4:
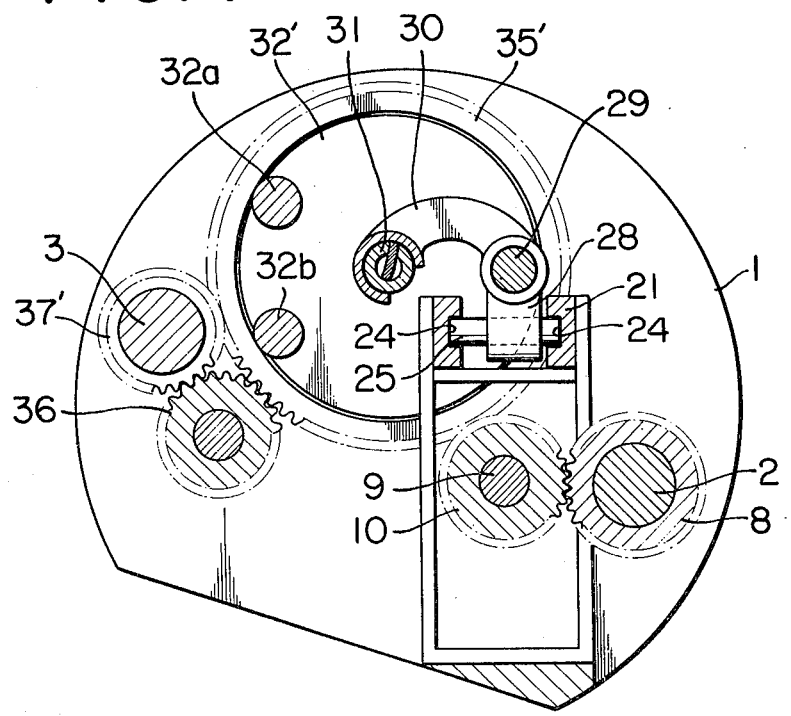

The upper end of the elevating frame 18 is connected to one end of the rocking rod 21 of the present invention by means of the pin 20. The rocking rod 21 is arranged approximately horizontally, and its other end is rockably connected to the bearing 22 vertically installed on the frame 1 by means of the pivot 23. Therefore, the rocking rod 21 rocks around the pivot 23 as a center, according to the up-and-down motion of the elevating frame 18. As shown in FIG. 4, the rocking rod 21 is provided with a pair of axially opposite guide grooves 24 and 24. Both ends of the bar-like sliding part 25 are movably fitted in the above guide grooves 24 and 24 along the axial direction of the rocking rod 21. To the sliding part 25, one end of the wire 26 is connected, the wire 26 being led out of the frame 1 to be connected to a manual pulling mechanism (not shown) of a bicycle handle (not shown), for example. Consequently, when the wire 26 is pulled, the sliding part 25 moves from the side of the pivot 23 of the rocking rod 21 to the side of the pin 20. Meantime, the coil spring is installed between the sliding part 25 and the pivot 23. Therefore, when the wire 26 is released, the sliding part 25 returns automatically toward the pivot 23 by the pulling force of the coil spring 27. The vertical rod 28 is movably fitted in the sliding rod 25 in its axial direction, to the upper end of the vertical rod 28, the arc-shaped rocker arm 30 being connected by means of the pin 29. The tip of the rocker arm 30 is so connected to the rotating shaft 31 that such tip can move in the axial direction of the rotating shaft 31, and at the same time can rotate the rotating shaft 31 in a body.

Accordingly, when the sliding part 25 which rocks together with the rocking rod 21 rocks, the rotating shaft 31 is made to reciprocate through the rocker arm 30.

To both ends of the rotating shaft 31, the centers of the ratchet outside casings 32 and 32' are secured firmly in a body. The reinforcement rods 32a and 32b are eccentrically bridged from the rotating shaft 31 between these ratchet outside casings 32 and 32'. On the circumferential inside face of the ratchet outside casings 32 and 32', two series of the ratchet pawls 33... and 33'... are rotatably mounted respectively. These ratchet pawls 33..., and 33'... are made of magnetic material. In this case, the ratchet pawls 33... mounted on the ratchet outside casing 32 are so arranged that their direction is opposite to that of the ratchet pawls 33'... mounted on the other ratchet outside casing 32'. In these ratchet outside casings 32 and 32', the ratchet wheels 34 and 34' are accommodated, which are rotatably mounted on both ends of the rotating shaft 31 by means of bearings. These ratchet wheels 34 and 34' mesh with the ratchet pawls 33... and 33'... respectively and are made to rotate. In this case, the ratchet pawls 33 and 33' are detained, so the ratchet wheels 34 and 34' rotate in opposite directions. These ratchet wheels 34 and 34' possess spur gears 35 and 35' on their outsides respectively. The above spur gears 35 and 35' rotate together with the ratchet wheels 34 and 34' respectively in a body. One spur gear 35' meshes with the pinion 37' mounted on one end of the output shaft 3 through the intermediate toothed wheel 36 secured on the intermediate shaft. On the other hand, the other spur gear 35 meshes with the pinion 37 directly mounted on the other end of the output shaft 3. The output shaft 3 has the transmission sprocket 38 in a body on its projected tip from the frame 1 to transmit the rotating motion of the output shaft 3 to the rear wheel by means of the chain 40 connecting the above-mentioned sprocket 38 with the sprocket 39 mounted on the driven wheel of a bicycle, for example, the rear wheel 19 of a bicycle.

The operation of the above arrangement will be explained as follows.

when a cyclist treads the pedal 5, the rotating motion of the pedal 5 is transmitted to the input shaft 2 through the driving sprocket 4b, the chain 6 and the driven sprocket 4a. Since the rotating motion of the input shaft 2 is transmitted to the interlocking shaft 9, the pinion 13 and the cam 14 mounted on the interlocking shaft 9 are made to rotate in one direction. The fan-shaped portion of the cam 14 presses one cam support (for example 17') of the floating frame 15, so the whole body of the floating frame 15 moves a little horizontally in one direction. As a result, the rack 16 on the opposite side of the cam support 17' is made to mesh with the pinion 13. In this case, the pinion 13 is rotating, so the rack 16 moves up (or moves down), whereby the whole body of the floating frame 15 moves up (or moves down) too. When the cam 14 rotates and moves to the opposite position, the fan-shaped portion of the cam 14 presses the other cam support 17 and moves the whole body of the floating frame horizontally in the opposite direction. Therefore, the pinion 13 meshes with the other rack 16'. In this case, the rack 16' moves down, so the whole body of the floating frame 15 lowers. In this way, the floating frame 15 repeats the following motions; moving up, horizontal motion in one direction, lowering and horizontal motion in an opposite direction.

Of the motions of the floating frame 15, only its raising and lowering motion are transmitted to the elevating frame 18, and such motions transmitted to the elevating frame is in turn transmitted to the rocking rod 21.

In other words, the upper end of the elevating frame 18 is connected to one end of the rocking rod 21, so that rocking rod 21 rocks by angle θ which corresponds to the raising and lowering stroke of the elevating frame 18, around the pivot 23 as a center. The rocking angle of the rocking rod 21 is constant, but the displacement stroke of the sliding part 25 which is movably installed in the axial direction of the rocking rod varies according to the position of the rocking rod 21 in the axial direction. That is to say, when the sliding part 25 takes position on the side of the pivot 23, the amount of the rocking displacement of the sliding part 25 is small. To the contrary, when the sliding part 25 draws near the pin 20 pulled by the wire 26, when a cyclist operates the pulling mechanism, the amount of the rocking displacement of the sliding part 25 becomes large.

The above-mentioned rocking motion of the sliding part 25 raises or lowers the vertical rod 28. Accordingly, the rocker arm 30 puts the rotating shaft 31 in a reciprocating rotary motion. The amount of such reciprocating rotary motion of the rotating shaft 31 varies according to the amount of the rocking displacement of the sliding part 25.

When the rotating shaft 31 is put in a reciprocating rotary motion, the ratchet outside casings 32 and 32' are respectively placed in a reciprocating rotary motion in a body to each other. During the going rotating motion of these ratchet outside casings 32 and 32', one series of the ratchet pawls 33... mesh with the ratchet wheel 34 to rotate it in a body. On the other hand, the other series of the ratchet pawls 33'... do not mesh with the other ratchet wheel 34', since the direction of their teeth is reverse. For this reason, the ratchet wheel 34' does not rotate. To the contrary, during returning rotating motion of the ratchet outside casings 32 and 32', the series of the ratchet pawls 33... do not mesh with the ratchet wheel 34, but the series of the ratchet pawls 33'... mesh with the ratchet wheel 34' to rotate it in the direction opposite to the rotating direction of the ratchet wheel 34. In this way, the ratchet wheels 34 and 34' are made to rotate alternately and in the opposite direction to each other. Therefore, each spur gear 35 and 35' is also made to rotate alternately and in the opposite directions to each other. Meantime, one spur gear 35 meshes with the pinion 37 on the output shaft 3 through the intermediate toothed wheel 36, while other spur gear 35' meshes directly with the other pinion 37 on the output shaft 3. For this reason, the alternate rotating motions of the spur gears 35 and 35' are converted into unidirectional rotation of the output shaft 3, and the output shaft 3 is made to rotate in one direction only. Therefore, the output shaft 3 transmits rotational driving force to the rear wheel.

When the sliding part 25 is moved in the axial direction of the rocking rod 21 by the pulling action of the wire 26, the amount of rocking displacement of the sliding part 25 increases. As a result, the amount of the reciprocating rotary motion of the rotating shaft by the rocker arm 30 increases. Consequently, the amount of the rotating motion of each ratchet wheel 34 and 34' increases, resulting in the increase in the number of revolution of the output shaft 3. In this case, if constant number of revolution is transmitted to the input shaft 2, the number of revolution of the output shaft 3 can be varied by changing the position of the sliding part 25. When the wire 26 is released, the sliding part 25 automatically returns to its fomer position by means of the coil spring 27, and the bicycle runs at low speed again.

Of course, it is possible to change running speed of a bicycle by only changing the rotation number of the pedal by adjusting treading force.

Figure 10:
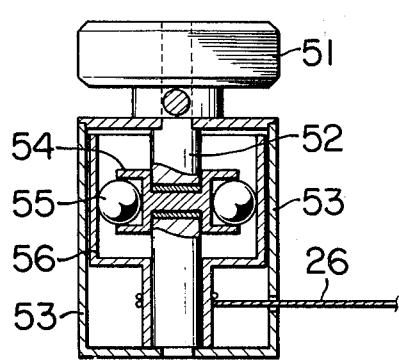

In the mechanism explained in detail above, the running speed of a bicycle can be changed by pulling the wire 26 manually. However, when the device having the construction as shown in FIG. 10 is employed, the running speed of a bicycle can be automatically changed. In FIG. 10, 51 is the roller which is in contact with the wheel and is made to rotate by it. While the roller shaft 52 of the roller 51 is rotatably supported on the frame 53 secured on the bicycle frame, etc. The roller shaft 52 is provided with the ball supporting frame 54 in a body. A plurality of balls 55... are arranged on the circumference of the roller shaft 52 of the ball supporting frame 54. These balls 55 can move in a radial direction by centrifugal force. On the outside of the ball supporting frame 54, the rotating frame 56 is installed. The rotating frame 56 is freely inserted so that it can rotate independently of the roller shaft 52, and the balls 55 come into contact with its internal face. The tip of the wire 26 is fastened to the rotating frame.

When a bicycle is running, the roller 51 rotates in contact with the wheel, and thus the roller shaft 52 and the ball supporting frame 54 rotate too. In this case, the balls 55... come into contact with the rotating frame 56 by centrifugal force. However, at low running speed, due to small centrifugal force, the balls 55... roll on the rotating frame 56. When the number of revolution of the pedal 5 increases and high running speed is reached, the balls 55 are strongly pressed against the rotating frame 56 and rotate it around the roller shaft 52 as a center. Therefore, the wire 26 is pulled, because it is wound up on the rotating frame 56. As a result, the sliding part moves, resulting in automatic speed change.

Figure 1:
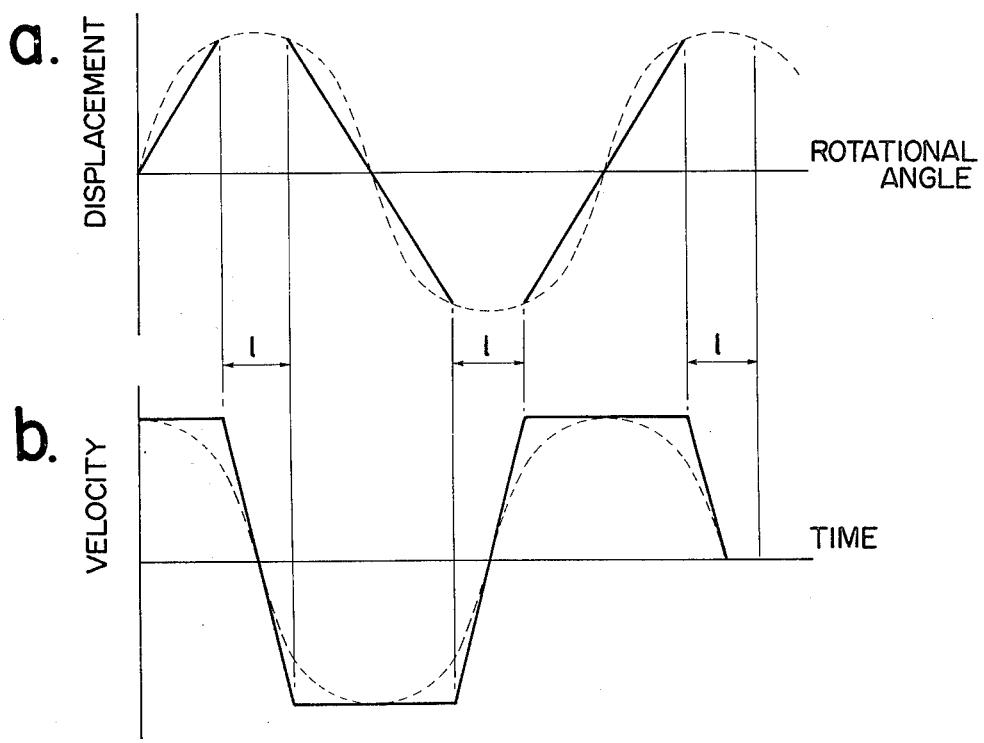
FIGS. 1a and 1b are schematic diagrams explanatory of the background of the present invention, with FIG. 1a showing a characteristic curve representative of the relationship between the rotating angle of the crank and the displacement of the piston and FIG. 1b showing a characteristic curve representative of the relationship between the speed change ratio of the piston and time.

In the stepless speed change gear for a bicycle of the above-mentioned construction, when the rotating motion of the interlocking shaft 9 is converted into the linear reciprocating motion of the elevating frame 18, either one of the cam supports 17 and 17' is pressed by the cam 14 so that the pinion 13 meshes with the rack 16 or rack 16'. Therefore, during the linear motion of the elevating frame 18, the pinion 13 meshes with the rack 16 or rack 16', and the rack 16 or the rack 16' makes linear motion at the same rotating circumferetial speed as that of the interlocking shaft 9. As a result, the elevating frame 18 makes uniform linear reciprocating motion as shown by the solid line in FIGS. 1a and 1b. In FIG. 1b, the zone L shows the gap from a position where one cam support 17 or 17' is pressed by the cam 14 to a position where the other cam support 17 or 17' is pressed by the cam 14, in other words, the zone L shows play for the directional change of linear reciprocating motion.

When the elevating frame 18 makes uniform linear reciprocating motion as mentioned above, the rocking rod 21 rocks at a uniform speed. Speed change can be performed in the range of strong force with small loss and easy control.

Figure 11:
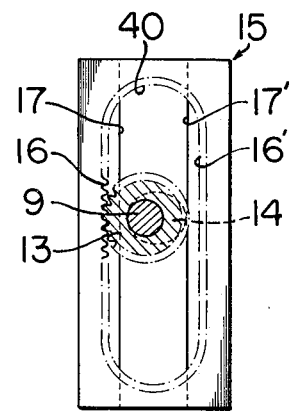

In the above embodiment, independent and opposite racks 16 and 16' are explained. However, as shown in the embodiment in FIG. 11, it is possible to employ two racks 16 and 16' whose upper and lower ends are connected to each other by means of the arc-shaped toothed parts 40 and 40. In this case, when the pinion 13 changes its mesh from one rack to the other rack, such change of mesh becomes surer and smoother, because the pinion 13 is guided by means of the toothed parts 40 and 40.

As explained above in detail, in the present invention, the opposite cam supports are alternately pressed and moved by the cam mounted on the rotating shaft, and due to the movement of the floating frame on which the cam supports are mounted, the pinion mounted on the rotating shaft is made to mesh with the rack portion installed on the floating frame. As a result, the floating frame makes linear motion in the direction at a right angle to the direction in which it is presses and moved by the cam. Thus the linear reciprocating element is made to have linear reciprocating motion in one direction by means of the floating frame. Since the linear reciprocating element makes linear motion only while the pinion meshes with the rack portion, the above linear motion becomes uniform. The above uniform linear reciprocating motion has various advantages, for example, easy control, very wide application, etc.

On the other hand, in the present invention, the sliding part is movably installed in an axial direction on the rocking rod whose one end is pivotally mounted and whose other end can make rocking motion. To the sliding part, one end of the rocker arm is pivotally mounted, and its other end is connected to the rotating shaft in a movable manner in its axial direction.

Accordingly, in this construction, the rocking motion of the rocking rod is transmitted to the rocker arm, and the rocker arm reciprocates and rotates the rotating shaft, and at the same time moves the sliding part in the axial direction of the rocking rod. Such movement of the sliding part varies the amount of the rocking motion of the sliding part. Therefore, the rotational amount transmitted to the rotating shaft through the rocker arm varies too, and whereby the reciprocating rotary angle of the rotating shaft can be controlled. In addition, to realize the spirit of the present invention, it is enough to mount the sliding part on the rocking rod in a movable manner in its axial direction, and to install the rocker arm on the rotating shaft in a movable manner in its axial direction. Therefore, the present invention has such advantages as very simple construction, easy control and wide application, etc.

Furthermore, in the present invention, during going rotating motion of the rotating shaft, one ratchet wheel rotates in one direction through one ratchet pawls. To the contrary, during the returning rotating motion of the rotating shaft, the other ratchet wheel rotates in the opposite direction through the other ratchet pawls. Meantime, said one ratchet wheel transmits its rotating motion to the output shaft, while the other ratchet wheel transmits its rotating motion to the output shaft, after reversing its rotating direction. Therefore, during both going and returning rotating motion of the rotating shaft, its rotating motion is transmitted to the output shaft. In this case, the output shaft rotates only in one direction, so the power transmission effciency of the invention is excellent. The ratchet pawls are installed on the ratchet outside casings mounted on both ends of the rotating shaft. In the above ratchet outside casings, the ratchet wheels are housed and these ratchet wheels are rotatably mounted on both ends of the rotating shaft. For thid reason, the present invention can be compactly and simply constructed.

What is claimed is:

1. A device for converting a rocking motion into a reciprocating rotary motion comprising a rocking rod having one end thereof pivotally supported and the other end thereof rockably disposed, means to drive said rocking rod in a rocking motion, a sliding part provided on said rocking rod and freely movable longitudinally along said rod, a rotating shaft the longitudinal axis of which generally parallels the longitudinal axis of said rocking rod, and a rocker arm having one end thereof pivotally mounted on said sliding part and the other end thereof coupled to said rotating shaft and freely movable longitudinally along said rotating shaft, the rocking motion of said rocking rod being transmitted to said rotating shaft through said rocker arm so as to reciprocatedly rotate said rotating shaft with the amount of rotation of said rotating shaft produced by each rocking of said rocking rod being adjustable by shifting said sliding part along said rocking rod.

2. The device for converting a rocking motion into a reciprocating rotary motion according to claim 1, wherein said device further comprises ratchet outside casings provided integrally to the opposite ends of said rotating shaft, a pair of ratchet pawls each installed on one of said ratchet outside casings in an opposite directional disposition of each other in such a manner that said ratchet pawls can rotate integrally with said rotating shaft and a pair of ratchet wheels each housed in one of said ratchet outside casing and fitted floatedly rotatably onto said rotating shaft, characterized in that said ratchet pawls are engaged with said ratchet wheels in such a manner that the rotation of said rotating shaft in one direction causes rotation one of said ratchet wheels in one direction through one of said ratchet pawls, while the rotation of said rotating shaft in the opposite direction causes the other of said ratchet wheels to rotate in the opposite direction through the other of said ratchet pawls, and the rotation of said one of said ratchet wheels is directly transmitted to an output shaft, while the rotation of said other of said ratchet wheels are reversed in the direction thereof and, then, transmitted to said output shaft so that said output shaft is rotated only in one predetermined direction.

3. The device for converting a rocking motion into a reciprocating rotary motion according to claim 1, wherein said device further comprises a rotary shaft provided coaxially with a pinion and integral cam, a linear reciprocating member disposed transversely to said rotary shaft, a floating member which is mounted on said linear reciprocating member and floatedly movable only in the direction perpendicular to the moving direction of said linear reciprocating member, a pair of racks provided on the opposite sides of said pinion spaced apart from each other so as to alternately mesh with said pinion, and a pair of cam supports provided on the opposite sides of said cam so as to alternately come into contact with said cam in a sliding manner.

* * * * *

UNITED STATES PATENT OFFICE
CERTIFICATE OF CORRECTION

PATENT NO. : 4,135,409
DATED : January 23, 1979
INVENTOR(S) : Rakuichi Ishimaru

It is certified that error appears in the above-identified patent and that said Letters Patent are hereby corrected as shown below:

In column 1 of the front page, between the lines marked [76] and [21] insert the following:
---[73] Assignee: Raduichi Ishimaru and
Masakazu Eki, Hiroshima-ken, Japan.----

Signed and Sealed this

Seventeenth Day of July 1979

[SEAL]

Attest:

Attesting Officer

LUTRELLE F. PARKER
*Acting Commissioner of Patents and Trademarks*